United States Patent
Saphier

(10) Patent No.: US 8,877,070 B2
(45) Date of Patent: Nov. 4, 2014

(54) OXIDATION OF ORGANIC CONTAMINANTS PRESENT IN WASTEWATER

(76) Inventor: Magal Saphier, Beer-Sheva (IL)

(*) Notice: Subject to any disclaimer, the term of this patent is extended or adjusted under 35 U.S.C. 154(b) by 634 days.

(21) Appl. No.: 13/138,330

(22) PCT Filed: Jan. 28, 2010

(86) PCT No.: PCT/IL2010/000072
§ 371 (c)(1),
(2), (4) Date: Oct. 24, 2011

(87) PCT Pub. No.: WO2010/086853
PCT Pub. Date: Aug. 5, 2010

(65) Prior Publication Data
US 2012/0031853 A1   Feb. 9, 2012

Related U.S. Application Data

(60) Provisional application No. 61/149,023, filed on Feb. 2, 2009.

(51) Int. Cl.
| | | |
|---|---|---|
| *C02F 1/72* | (2006.01) | |
| *C02F 1/74* | (2006.01) | |
| *C02F 1/70* | (2006.01) | |
| C02F 101/38 | (2006.01) | |
| C02F 101/34 | (2006.01) | |
| C02F 103/38 | (2006.01) | |
| C02F 103/36 | (2006.01) | |
| C02F 101/32 | (2006.01) | |

(52) U.S. Cl.
CPC ............... *C02F 1/705* (2013.01); *C02F 1/727* (2013.01); *C02F 2101/38* (2013.01); *C02F 1/74* (2013.01); *C02F 2101/345* (2013.01); *C02F 2103/38* (2013.01); *C02F 2103/365* (2013.01); *C02F 1/722* (2013.01); *C02F 1/725* (2013.01); *C02F 2101/32* (2013.01)
USPC ........................... 210/759; 210/763; 210/766

(58) Field of Classification Search
CPC .............. C02F 1/02; C02F 1/70; C02F 1/705; C02F 1/72; C02F 1/722; C02F 1/74
USPC .................. 210/749, 758, 759, 763, 766
See application file for complete search history.

(56) References Cited

U.S. PATENT DOCUMENTS

| | | |
|---|---|---|
| 1,428,618 A | 9/1922 | Wagner |
| 4,840,735 A | 6/1989 | Goodwin |
| 6,521,735 B2 * | 2/2003 | Mitsui et al. ................ 528/215 |
| 2003/0173306 A1 | 9/2003 | Cha et al. |

FOREIGN PATENT DOCUMENTS

| | | |
|---|---|---|
| WO | WO 03/020648 | 3/2003 |
| WO | WO 2008/119063 | 10/2008 |

OTHER PUBLICATIONS

International Search Report for PCT/IL2010/000072, mailed Apr. 19, 2010.
Written Opinion for PCT/IL2010/000072, mailed Apr. 19, 2010.

* cited by examiner

*Primary Examiner* — Lucas Stelling
(74) *Attorney, Agent, or Firm* — Nixon & Vanderhye P.C.

(57) ABSTRACT

A process for oxidizing a chemical contaminant selected from the group consisting of (i) aromatic compounds, (ii) unsaturated compounds having one or more of the following bonds: C=C, C≡C, C=O and C=N, and (iii) amines, which process comprises combining the chemical contaminant and cuprous ($Cu^+$) ions in an aqueous solution in a reaction vessel in an essentially oxygen-free environment, and subsequently feeding an oxidizer to said solution.

12 Claims, 5 Drawing Sheets

OXIDATION OF ORGANIC CONTAMINANTS PRESENT IN WASTEWATER

This application is the U.S. national phase of International Application No. PCT/IL2010/000072 filed 28 Jan. 2010 which designated the U.S. and claims the benefit of U.S. Provisional Application No. 61/149,023 filed 2 Feb. 2009, the entire contents of each of which are hereby incorporated by reference.

Phenol and phenol derivatives are carcinogenic and toxic to aquatic life, and therefore their presence in wastewater, even at low concentrations, constitutes a problem which requires special attention from the relevant industries and health authorities. More specifically, the following industries may cause the contamination of water by phenols: the plastic (polymers) industry, manufacturers of organic compounds, the wood industry (Formica) and the petrochemical industry.

In view of the fact that phenol and its derivatives generally dissolve very well in water, their removal from aqueous solutions cannot be readily accomplished by means of conventional separation techniques, such as extraction. The oxidation of the phenol ring to produce harmless derivatives is, unfortunately, also difficult to achieve. Consequently, methods for treating phenol-containing wastewater include: dilution of the aqueous solution to the permitted level; burning with fuel; biotechnological techniques; radiation chemistry and the Fenton reaction.

In addition to phenol and derivatives thereof, many other organic contaminants, which are not readily oxidizable, are also produced by the industries mentioned above, rendering the purification of wastewater difficult.

Harmankaya et al. [Tr. J. of Engineering and Environmental Sciences, 22 p. 9-15 (1998)] report the heterogeneous catalytic oxidation of phenol in aqueous solutions using solid copper oxide and copper oxide/zinc oxide pair supported on alumina. Massa et al. [Latin American Applied Research, 34, p. 133-140 (2004)] describe the oxidation of phenol solutions in an autoclave reactor using a solid catalytic system consisting of copper oxide in combination with zinc, aluminum or nickel oxides.

The inventor has found that the complex of cuprous ion ($Cu^+$) with aromatic compounds, unsaturated compounds or organic amines is useful in the catalysis of the oxidation of said organic compounds.

The present invention relates to a process for oxidizing a chemical contaminant selected from the group consisting of (i) aromatic compounds, (ii) unsaturated compounds having one or more of the following bonds: $C=C$, $C\equiv C$, $C=O$ and $C=N$, and (iii) amines, which process comprises combining the contaminant and cuprous ($Cu^+$) ions in an aqueous solution in reaction vessel in an essentially oxygen-free environment, and subsequently feeding an oxidizer to said solution.

The process of the present invention is especially useful for treating wastewater, namely, for destroying organic contaminants present in wastewater. As used herein, the term "wastewater" includes industrial wastewater. The process of the invention involves the formation of a complex of cuprous ion with the organic compound (the contaminant), and subsequently, the oxidation of said complex, with the oxidizer being, for example, molecular oxygen, hydrogen peroxide or a mixture thereof. The process does not require the presence of heterogeneous, solid supported copper salts catalysts.

The organic or inorganic contaminants which can be oxidized by the method of the invention fall into three subclasses: (i) aromatic compounds, (ii) unsaturated (non aromatic) compounds which contain one or more of the following bonds: $C=C$, $C\equiv C$, $C=O$ and $C=N$ and (iii) amines.

Aromatic compounds, which can be oxidized in the wastewater according to the invention, contain one or more C5-C7 aromatic rings, which may be optionally substituted, especially with carboxylic acid, hydroxyl groups and halogen atoms, for example: benzene and derivatives thereof, phenol and derivatives thereof, benzoic acid and derivatives thereof and chloro substituted biphenyl compounds (known as PCB). Heterocyclic aromatic compounds, such as pryidine, pyrrole, furan, thiophene and their derivatives, may also be treated by the oxidation process of the invention. Polycyclic systems, in which two or more aromatic and heterocyclic rings are fused together, such as naphthalene and derivatives thereof, anthracene and derivatives thereof, chloro substituted benzofurans and dioxins (chloro substituted dibenzo-p-dioxin) and hormones can also be treated by the method of the invention.

The unsaturated compounds which contain one or more of following bonds: $C=C$, $C\equiv C$, $C=O$ and $C=N$ include, for example, unsaturated hydrocarbons with one or more double or triple bonds, namely, alkenes and alkynes; unsaturated organic and inorganic compounds having carbon atom with it system that can contribute to d-π* interactions like carbon monoxide CO; R—CN(R may refer to H, $CH_3$).

The amine compounds which can be oxidized in the wastewater according to the invention include ammonia ($NH_3$), and primary, secondary or tertiary amines ($NH_2R^1$, $NHR^1R^2$ and $NR^1R^2R^3$, wherein $R^1$, $R^2$, $R^3$, which may be the same or different, are organic moieties, such as straight or branched alkyl, e.g., C1-C7 alkyl).

In practice, the contaminant-containing aqueous solution (e.g., the wastewater to be treated) and a source of cuprous ion, as described in more detail hereinafter, are charged into a suitable reaction vessel. The complex formation reaction of the invention is carried out in an inert atmosphere, i.e., in an essentially oxygen-free environment. By the term "essentially oxygen-free environment" is meant that the amount of the oxygen in the solution is kept below a level which may significantly destroy the cuprous ion; the oxygen level in the solution is thus preferably less than 3 ppm, more preferably less than 1 ppm and even more preferably less than 0.1 ppm. Thus, the reaction medium is subjected to de-aeration during the course of the reaction. The de-aeration of the solution may be carried out by continuously bubbling an inert gas such as argon, helium or nitrogen, during the complex formation reaction. Alternatively, the complex formation reaction is carried in an inert, deaerated solution in a sealed reaction vessel. On a laboratory scale, de-aeration of the reaction mixture may be carried out using the syringe technique or by continuously bubbling the inert gas through the reaction mixture. On an industrial scale, an inert atmosphere may be secured using the latter method.

The cuprous ion, which participates in the complex formation reaction, is generated in-situ in the aqueous solution (i.e., the wastewater) preferably by means of a reduction of cupric ion ($Cu^{2+}$) or the oxidation of copper metal, or both. More preferably, the aqueous solution comprises at least one water soluble cupric salt and copper metal, which react in a comproportionation reaction to form the cuprous ion ($Cu^+$) in situ, in the presence of a stabilizing ligand (which is the contaminant to be treated, namely, an aromatic ring, or the double or triple bond in the case of treating unsaturated organic compounds, or the nitrogen in the case of treating amines compounds). For this purpose, copper metal and a water soluble cupric salt are present in the de-aerated aqueous solution described above. Operative cupric salts include, for example, copper sulfate, cupric chloride, $Cu(NO_3)_2$ and $Cu(ClO_4)_2$. The concentration of the cupric ion in the aqueous reaction mixture may be in the range between 1 mM and 0.1M. The copper metal is conveniently provided in the form of sheets, grains, powder, wires, vessel surfaces and coiled tubes. In general, the metal is provided in a molar excess relative to the amount of the cupric ion.

It should be noted that $Cu^+$ is unstable in an aqueous solution, and undergoes auto-oxidation-reduction into copper and cupric ion (disproportionation reaction). However, the presence of the aromatic ring, the unsaturated or the amine compounds allows the stabilization of the cuprous ion through the formation of the complex, as illustrated by the following reaction, for the case wherein the contaminant is aromatic compound:

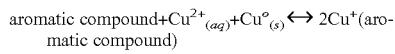

aromatic compound+$Cu^{2+}_{(aq)}$+$Cu°_{(s)}$ ↔ $2Cu^+$(aromatic compound)

For example, the characteristic equilibrium constant for the complex formation reaction, in the case where the aromatic compound is phenol, is: $K_{Phenol}=1\times10^3$ (at room temperature).

The complex formation reaction may be carried out under stirring over a wide range of temperatures, e.g. at a temperature in the range between 10 and 80° C., and preferably in the range between 25 and 35° C. The reaction typically lasts between 60 and 240 minutes. It should be understood that in practice, the process of the invention requires neither the identification nor the isolation of the complex formed between the cuprous ion and the organic contaminant. However, for the sake of completeness, the characteristics of the complex and methods for identifying its presence in the aqueous solution will now be described. The structure of the complex is d-π* complex and it may be verified by electrochemical methods, NMR (the NMR spectra of the $Cu^+$ complex exhibits a shift upfield), X-ray diffraction (in case of course of complexes that can be crystallized from the solution), quantum mechanical calculations and indirect spectroscopic methods. In practice, however, the formation of the complex may be indirectly confirmed by measuring the total concentration of copper ions in the solution. Alternatively, a competitive ligand is added to the solution, which ligand is capable of forming a complex with $Cu^+$ with a characteristic absorption band in the UV-Vis region. If the measured intensity of this characteristic band is less than the expected value, then this serves as an indication for the presence of another complex, namely, the $Cu^+$ complex with the organic contaminant. For example, FIG. 1 illustrates how fumaric acid may be used as a competitive ligand which can serve as an indicator for the presence of a complex of $Cu^+$ with phenol in the solution. The experiment, the results of which are shown in FIG. 1, was carried out as follows. Deaerated solutions containing phenol, $1\times10^{-4}$ mol $dm^{-3}$ $CuSO_4$ and $5\times10^{-3}$ mol $dm^{-3}$ fumaric acid at pH 3.0 were stirred in the presence of copper metal for 24 h. The reference solution had the same composition but was not stirred in the presence of a copper metal. The UV-Vis spectra were recorded using Diode Array HP 8452 Å UV-Vis spectrophotometer. The complex of copper with fumaric acid is known to absorb at a wavelength of 346 nm. As shown by the UV absorption spectra depicted in FIG. 1, the intensity of the characteristic absorption at 346 nm decreases upon increasing the concentration of the phenol in the aqueous solution, indicating the formation of a complex between the cuprous ion and the phenol (the spectra shown are numbered 0 to 3: 0, no phenol, $A_{346}=0.197$; 1, $5\times10^{-3}$ mol $dm^{-3}$ phenol, $A_{346}=0.179$; 2, $1\times10^{-2}$ mol $dm^{-3}$ phenol, $A_{346}=0.148$; 3, $1.5\times10^{-2}$ mol $dm^{-3}$ phenol, $A_{346}=0.123$.)

The preparation of the cuprous complex in the aqueous solution as set forth above is followed by feeding an oxidizer to the solution, accomplishing the oxidation reaction of the chemical contaminant.

The oxidation reaction may be carried out, inter alia, using pure oxygen (or a mixture thereof with an inert gas), air or hydrogen peroxide. The oxidizer is added to the aqueous solution in which the complex is present. In the case where the oxidizer is a gas, then the gas (e.g., air or pure oxygen) is gently bubbled through the solution using conventional means up to the saturation level of the gas in the aqueous solution. If the oxidizer is provided in a liquid form, such as an aqueous solution of hydrogen peroxide, then the addition of the oxidizer may be accomplished in one dose or in a portionwise manner. Not more that the stoichiometrically required amount of the hydrogen peroxide is generally added, and in most cases a lesser amount will be needed to complete the reaction. The oxidation reaction is carried out at a temperature in the range between 10 and 100° C., preferably between 30 and 70° C., more preferably between 50 and 70° C., during a period of time between 10 minutes and 120 hours, and preferably, between 10 minutes and three hours. Most conveniently, the reaction is carried out at atmospheric pressure or slightly above. It is believed that the molecular oxygen reacts with the cuprous ion, to generate powerful oxidizing agents in the solution, like $O_2^{·-}$ and ·OH, which proceed to oxidize the organic contaminant, generating non-hazardous oxidation products, which are non-aromatic compounds, e.g., non aromatic, short-chain organic acids.

The reaction may be monitored by HPLC (high pressure liquid chromatography), UV-Vis spectroscopy, TOC (total organic carbon), NMR (nuclear magnetic resonance) and IR (Infrared spectroscopy). Most conveniently, however, the reaction is monitored by UV-Vis spectroscopy and HPLC.

The process of the invention may be conveniently carried out either in a batch, using a single reactor, or in a continuous mode, employing two or more sequentially arranged reactors. For example, in a first reactor, the wastewater to be treated (e.g., phenol-containing wastewater) is combined with the cupric ($Cu^{2+}$) ion and the copper metal, to form the $Cu^{1+}$ complex. The resultant solution is continuously transferred into a second reactor, where the oxidation of the contaminant takes place. The first reactor is maintained in an oxygen-free atmosphere, whereas the second reactor is saturated with oxygen. Into the first reactor, the contaminated water to be treated is continuously charged together with the cupric ($Cu^{2+}$) salt, with copper metal being also placed in said first reactor, and a complex-containing solution is continuously withdrawn from the first reactor and charged into the second reactor to complete the oxidation, such that the residence time in the two reactors is essentially the same.

A suitable arrangement for running the process is shown in FIG. 2. The wastewater to be treated and the cupric ($Cu^{2+}$) salt are charged into a mixing tank A equipped with a stirrer (1). The resultant solution is fed by means of a pump (2) through a conduit into reactor B, which is a column provided with a gas inlet opening (3b) and a gas outlet opening (4b) at the bottom and top sections thereof, respectively. A copper pipe (5b) is positioned within the interior of the column. The copper pipe serves a dual function: a source of metal copper and also as a heat exchanger. Nitrogen, helium or other inert gas, kept in a suitable cylinder (D) is bubbled through a conduit to the gas inlet opening (3b) at the bottom of reactor B, which is maintained at a temperature of 30° C. The complex-containing solution is fed through a conduit (6) to a reactor C (which is essentially the same as reactor B, with a gas inlet opening (3c), a gas outlet opening (4c) and a copper pipe (5c)). Air is continuously bubbled from the gas inlet opening (3c) using a suitable compressor (7). Reactor C is maintained at a temperature of about 50-70° C., e.g., 60° C. Heating elements (8), e.g., one or more electrical heating devices, are connected to the reactors B and C. The residence time in each reactor is about two to five hours. The purified water is discharged from the top of reactor C through an opening (9).

Thus, according to one embodiment, the process is carried out in a continuous mode of operation, wherein contaminant-containing wastewater to be treated is combined with cupric ($Cu^{2+}$) ion and copper metal in a first reactor maintained in an oxygen-free atmosphere, and the resultant solution is continuously transferred into a second reactor, where the oxidation of the contaminant takes place using an oxidizer selected from the group consisting of air, pure oxygen and hydrogen peroxide.

The reaction, which results in the formation of a complex of the cuprous ion with phenol (the complex is designated $Cu^+$ (Phenol), is described by the following equation:

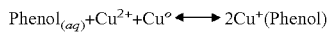

$$Phenol_{(aq)} + Cu^{2+} + Cu^0 \longleftrightarrow 2Cu^+(Phenol)$$

Oxidation Reaction:

An air stream is bubbled through the solution (the air was introduced through the gas inlet opening located at the bottom of the column by means of a capillary tube extending through the column, to form small bubbles). The pressure of the air stream was slightly above one atmosphere+the hydrostatic pressure of the solution. The oxidation reaction was carried out at different temperatures, with the reaction mixture being sampled periodically and subjected to HPLC analysis.

Table 1 below provides data regarding the progress of the reaction at different temperatures. The concentration of the phenol starting material in the solution was measured at different times by means of HPLC analysis, and is reported in the table, along with the calculated degree of oxidation.

HPLC conditions: elution solution: 70% $H_2O$, 30% $CH_3CN$; rate: 1 ml/min; wavelength=270 nm; retention time=1.80 min.

TABLE 1 oxidation of phenol with air

| Reaction Temperature (° C.) | 0 hr Concentration of Phenol (M) | % Oxidation | 1 hr Concentration of Phenol (M) | % Oxidation | 2 hr Concentration of Phenol (M) | % Oxidation | 3 hr Concentration of Phenol (M) | % Oxidation |
|---|---|---|---|---|---|---|---|---|
| 30 | $1.72 \times 10^{-3}$ | 0% | $1.70 \times 10^{-3}$ | 1.16% | $1.42 \times 10^{-3}$ | 17.5% | $1.33 \times 10^{-3}$ | 22.7% |
| 40 | $1.63 \times 10^{-3}$ | 0% | $7.87 \times 10^{-4}$ | 51.7% | $6.58 \times 10^{-4}$ | 59.6% | $3.67 \times 10^{-4}$ | 77.48% |
| 50 | $1.71 \times 10^{-3}$ | 0% | $3.06 \times 10^{-4}$ | 82.11% | $3.5 \times 10^{-5}$ | 97.95% | $1.1 \times 10^{-5}$ | 99.37% |
| 60 | $1.68 \times 10^{-3}$ | 0% | $2.65 \times 10^{-5}$ | 98.42% | $3.18 \times 10^{-6}$ | 99.81% | 0 | 100% |

Figure 1:
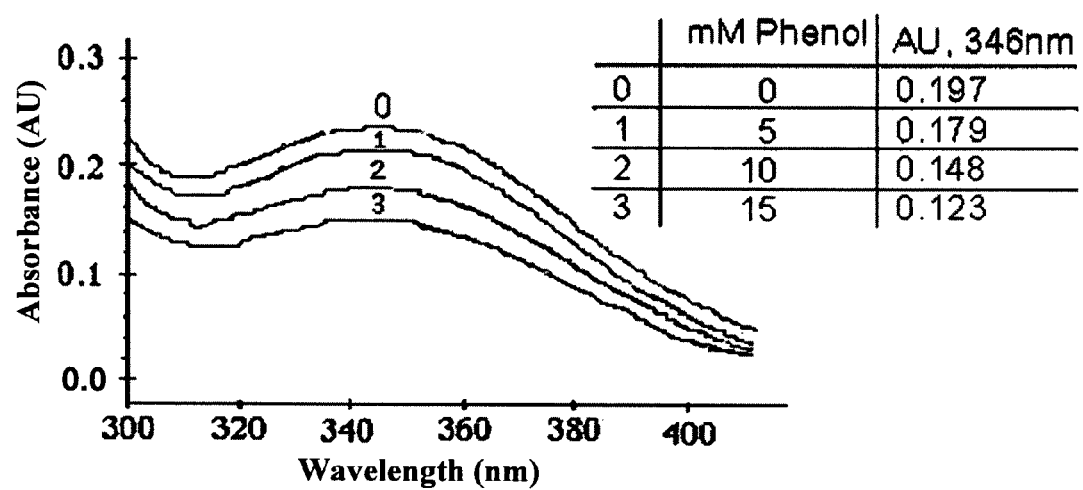
FIG. 1 shows UV spectra of several solutions containing phenol, $CuSO_4$, copper metal and fumaric acid at pH 3.0.
Figure 2:
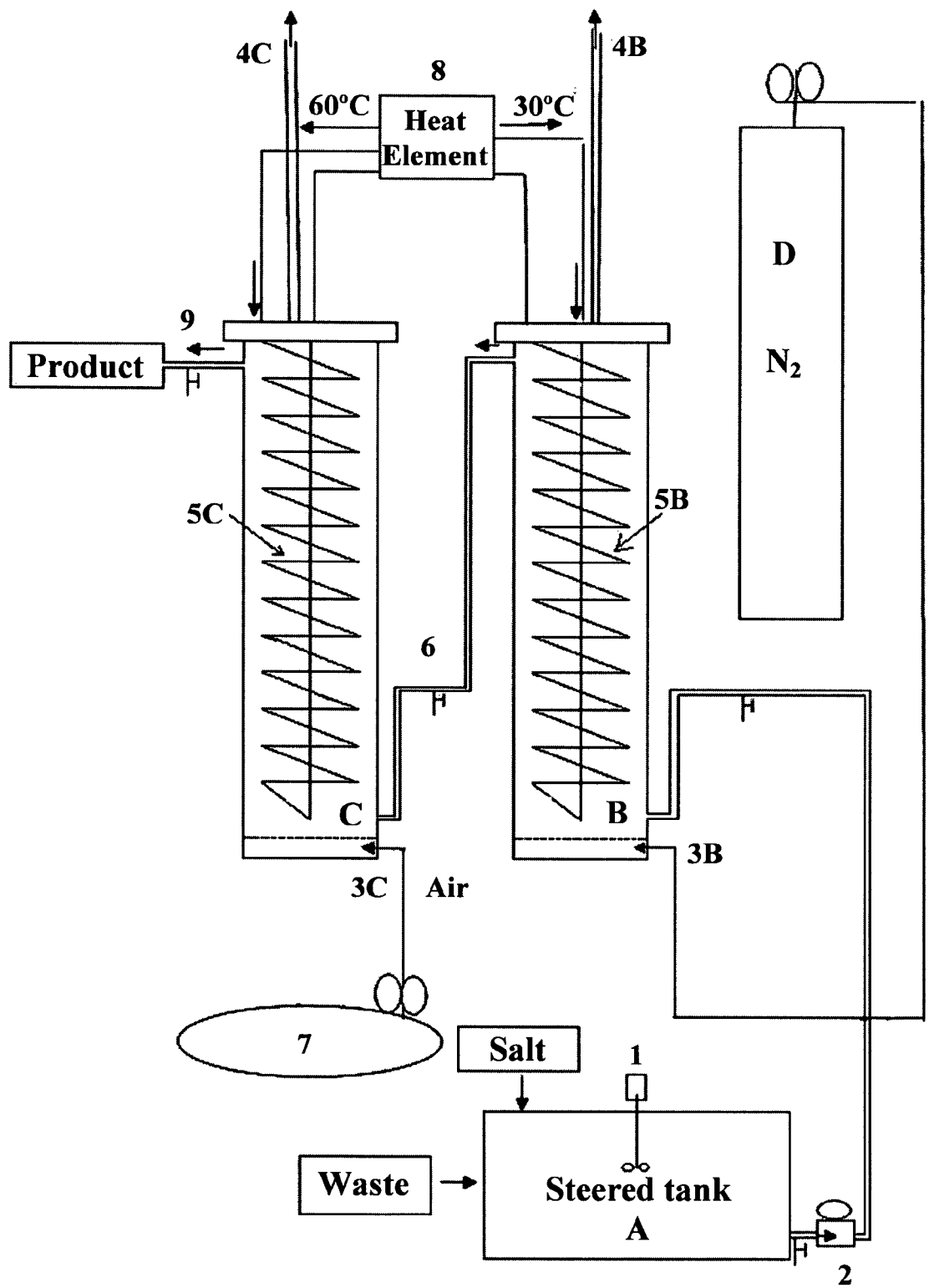
FIG. 2 illustrates an arrangement consisting of several reactors for carrying out the process of the invention in a continuous mode of operation.
Figure 3A:
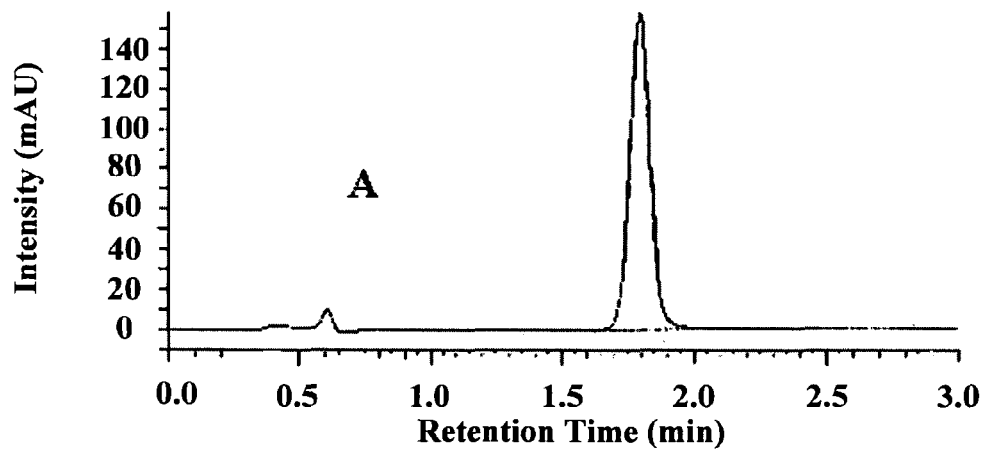
Figure 3B:
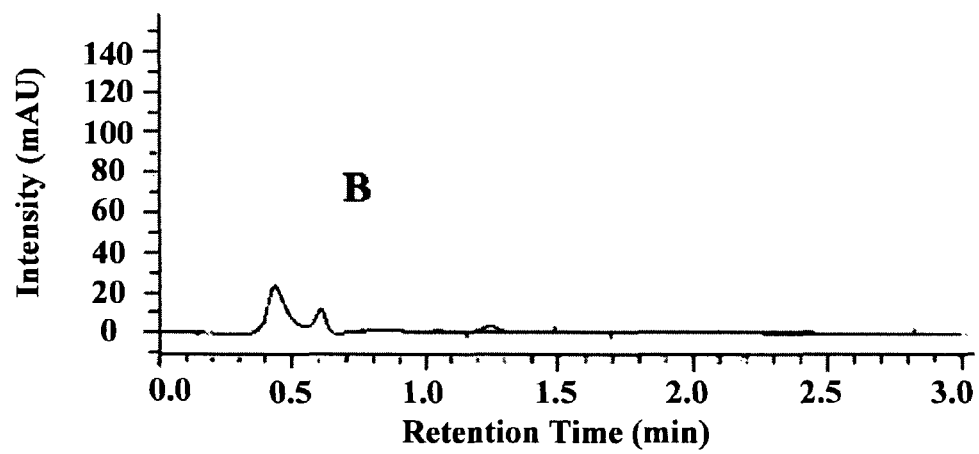

FIGS. 3a and 3b are HPLC chromatograms indicating the presence of phenol in the aqueous solution (3a) and its absence following the oxidation reaction (3b).

Figure 4A:
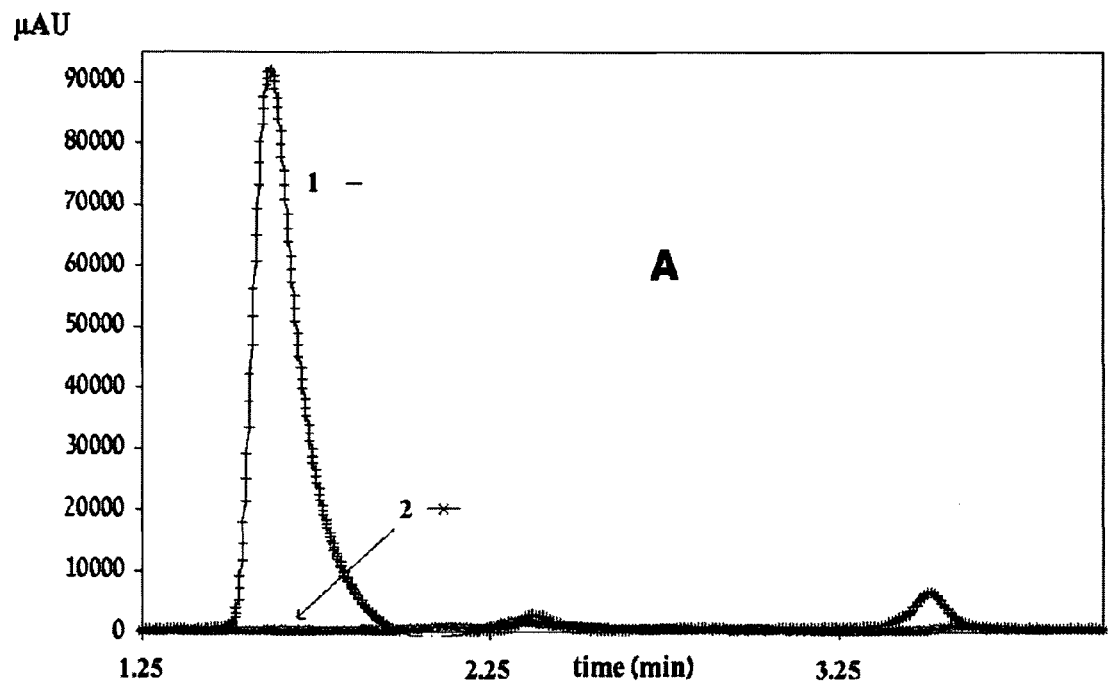
Figure 4B:
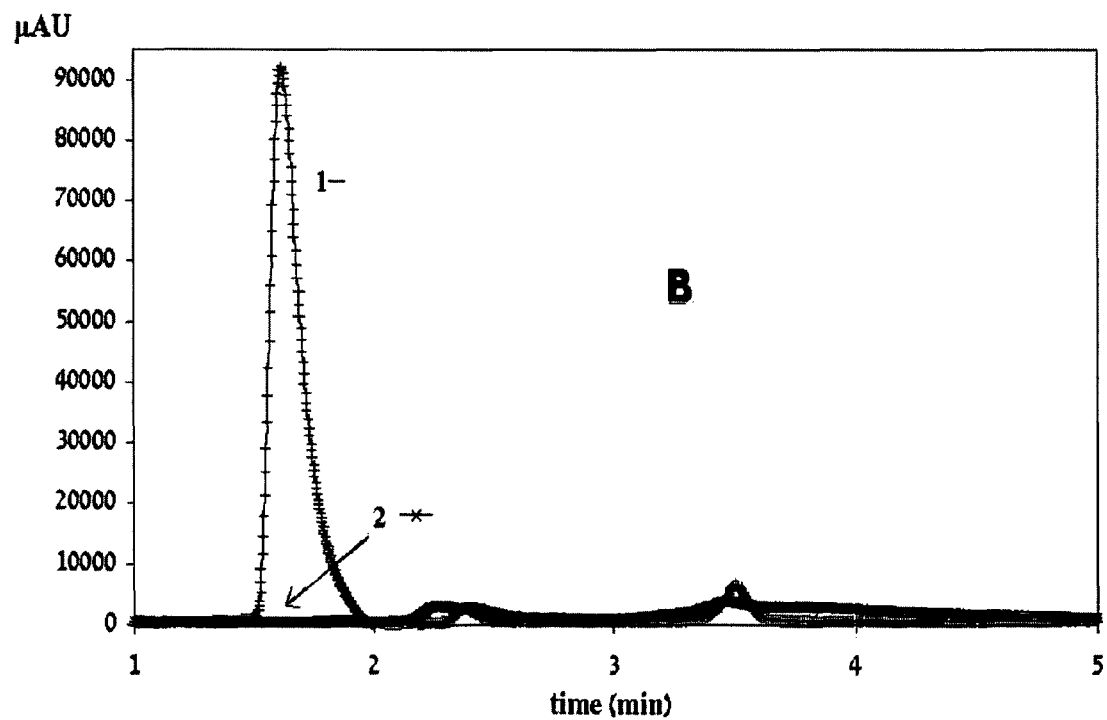

FIGS. 4a and 4b are HPLC chromatograms related to the oxidation of triethylamine using air (4a) and hydrogen peroxide (4b).

Figure 5A:
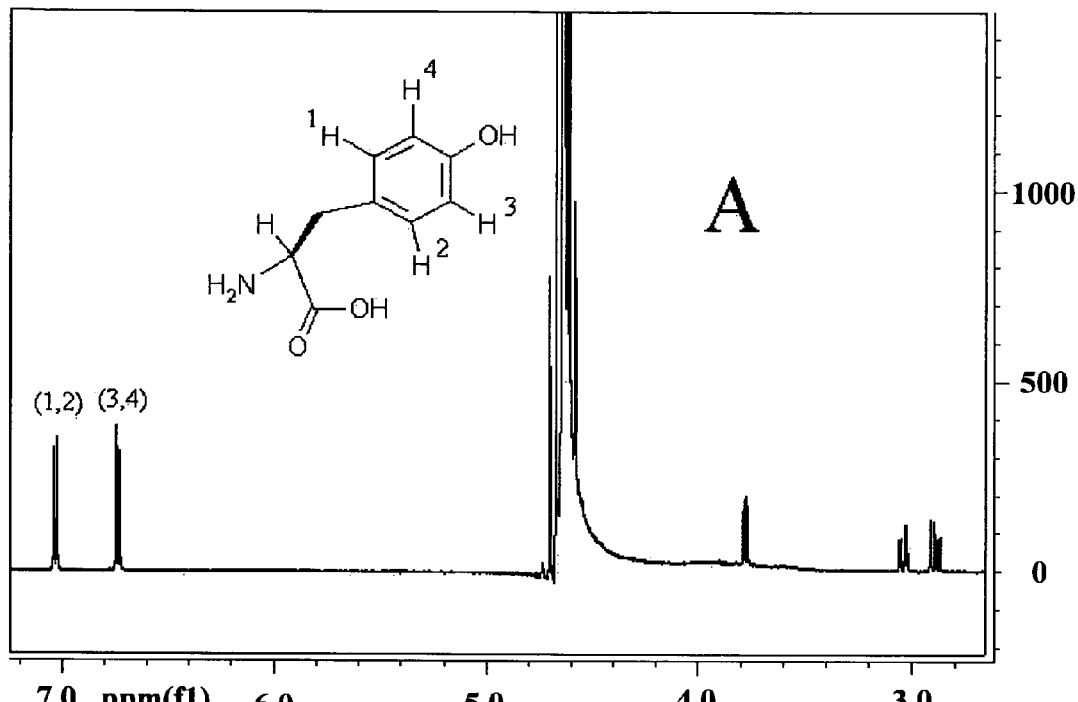
Figure 5B:
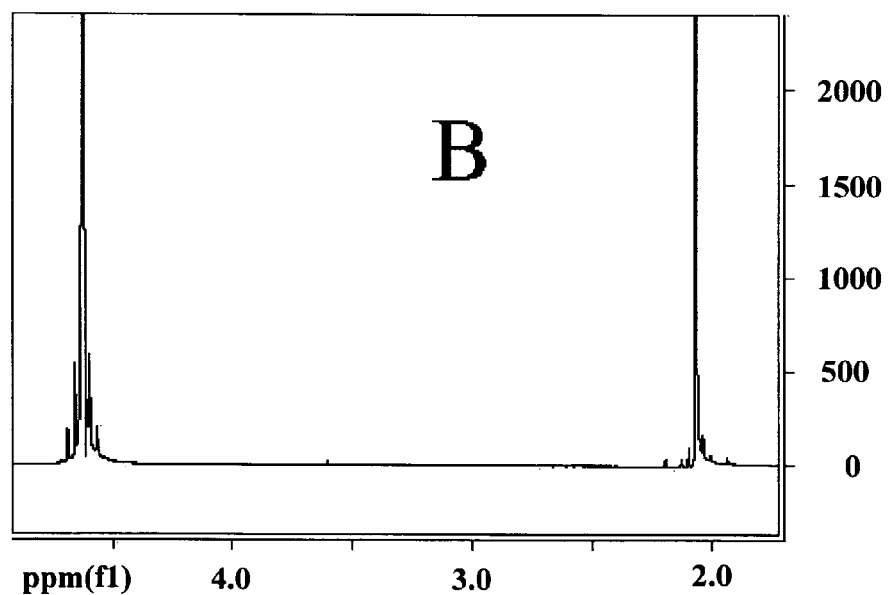

FIGS. 5a and 5b are NMR spectra of tyrosine before (5a) and after (5b) the process of the invention.

EXAMPLES

In the following examples, the following analytical methods were performed:
1) HPLC chromatographs were obtained using Jasco UV-1575 UV/Vis Detector with RP18 column.
2) UV-Vis spectra were recorded using Diode Array HP 8452A UV-Vis spectrophotometer.
3) H-NMR spectra were recorded using a Bruker DPX200 Hz spectrometer.

Example 1

Oxidation of Phenol

Complex Formation Reaction:

$CuSO_4 \cdot 5H_2O$ (0.02 g) is dissolved in 100 ml of aqueous 1 mM phenol solution in a column equipped with a gas inlet opening and a vent. A coil of metal copper pipe (D=4 mm, l=150 mm) is placed in the solution. The solution is deaerated with helium. The reaction proceeds for two hours at 30° C.

FIGS. 3a and 3b are the HPLC chromatograms of the solution before the initiation of the reaction and after three hours of air oxidation at 50° C., respectively. The data in Table 1 and the HPLC chromatograms of FIG. 3a, 3b indicate that the process of the invention allows rapid and effective oxidation of phenol in aqueous solutions.

Example 2

Oxidation of Triethylamine

Complex Formation Reaction:

triethylamine (0.14 ml, 1 mMol) is added to 80 ml aqueous solution which contains 1 mM $H_2SO_4$ and 0.1 mM $CuSO_4$. The pH is adjusted to 8.5 by the addition of NaOH solution, and the volume is corrected to 100 ml with distilled water. The solution is then placed in a 100 ml glass syringe equipped with a small magnetic stirrer. A piece of copper (2 cm×0.5 cm×0.5 cm) is placed in the solution, which is deaerated with helium. The sealed, oxygen-free solution is held for two hours at a temperature of 30° C., to give a complex of $Cu^+$ with triethylamine, as shown by the following chemical equation:

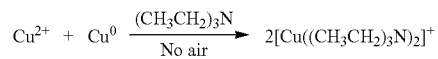

$$Cu^{2+} + Cu^0 \xrightarrow[\text{No air}]{(CH_3CH_2)_3N} 2[Cu((CH_3CH_2)_3N)_2]^+$$

Oxidation Reaction:

The oxidation reaction was carried using either air or hydrogen peroxide as the oxidant.

1) Air stream is bubbled through the solution (the air is introduced through the bottom of the syringe). The pressure of the air stream is slightly above 1 atmosphere+the hydrostatic pressure of the solution. After two hours at 60° C., more than 95% of the triethylamine starting material is oxidized. FIG. 4A is HPLC chromatogram of the triethylamine solution before (numeral 1) and after the reaction (numeral 2).

HPLC conditions: elution solution: 70% buffer $Na_2PO_4/Na_3PO_4$ at a concentration of 0.1M and pH 8.5, 30% $CH_3CN$; rate: 1 ml/min; wavelength=240 nm.

2) Hydrogen peroxide (0.5 ml of 0.3% solution, 0.5 mMol) was added to the triethylamine solution. After two hours at 60° C., more than 95% of the trietylamine was oxidized. FIG. 4B is HPLC chromatogram of the triethylamine solution before (numeral 1) and after the reaction (numeral 2). HPLC conditions were as indicated above.

Example 3

Oxidation of Tyrosine

Complex Formation Reaction:

$CuSO_4.5H_2O$ (0.02 g, 0.8 mmol) is dissolved in 80 ml aqueous 1 mM tyrosine solution at pH=1.8 (using $HClO_4$) in a 100 ml glass syringe equipped with a small magnetic stirrer and deaerated with He. A piece of metal copper (2 cm×0.5 cm×0.5 cm) is placed in the solution. The solution is held for two hours at a temperature of 30° C., to give a complex of $Cu^+$ with tyrosine.

Oxidation Reaction

Air stream is bubbled through the solution (the air is introduced through the bottom of the syringe). The pressure of the air stream is slightly above 1 atmosphere+the hydrostatic pressure of the solution. After two hours at 60° C., more than 95% of the tyrosine is oxidized. FIG. 5a shows H-NMR spectrum of the tyrosine and FIG. 5b shows H-NMR spectrum after the reaction. As shown by FIG. 5b, the picks of the aromatic hydrogens vanished, indicating the destruction of the aromatic ring.

The invention claimed is:

1. A process for oxidizing a chemical contaminant selected from the group consisting of (i) aromatic compounds, (ii) unsaturated non-aromatic compounds having one or more of the following bonds: C=C, C≡C, C=O and C=N, and (iii) amines, which process comprises combining the chemical contaminant and cuprous (Cu+) ions in an aqueous solution in a reaction vessel in an essentially oxygen-free environment, and subsequently feeding an oxidizer to said solution, wherein the aqueous solution comprises at least one water soluble cupric ($Cu^{2+}$) salt and copper metal, which undergo comproportionation reaction to form the cuprous ion ($Cu^+$) in situ.

2. A process according to claim 1, wherein the oxidizer which is fed to the aqueous solution is selected from the group consisting of air, pure oxygen and hydrogen peroxide.

3. A process according to claim 2, wherein the oxidizer is air.

4. A process according to claim 2, wherein the oxidation of the contaminant is carried out at a temperature in the range between 50 and 700 C.

5. A process according to claim 2, wherein the oxidation of the contaminant is carried out under atmospheric pressure.

6. A process according to claim 2, wherein the oxidation of the contaminant is carried out for a period between 10 minutes and three hours.

7. A process according to claim 1, wherein the chemical contaminant is an aromatic compound.

8. A process according to claim 7, wherein the aromatic compound is phenol.

9. A process according to claim 1, wherein the chemical contaminant is an amine compound.

10. A process according to claim 9, wherein the amine is triethylamine.

11. A process according to claim 7, wherein the aromatic compound is amino acid.

12. A process for oxidizing a chemical contaminant selected from the group consisting of (i) aromatic compounds, (ii) unsaturated non-aromatic compounds having one or more of the following bonds: C=C, C≡C, C=O and C=N, and (iii) amines, which process comprises combining the chemical contaminant and cuprous (Cu+) ions in an aqueous solution in a first reaction vessel in an essentially oxygen-free environment, and subsequently feeding an oxidizer to said solution, wherein the process is carried out in a continuous mode of operation, wherein contaminant-containing wastewater to be treated is combined with cupric (Cu2+) ion and copper metal in the first reaction vessel maintained in an oxygen-free atmosphere, and the resultant solution is continuously transferred into a second reaction vessel, where the oxidation of the contaminant takes place using an oxidizer selected from the group consisting of air, pure oxygen and hydrogen peroxide.

* * * * *